United States Patent
Jun et al.

(10) Patent No.: US 7,797,015 B2
(45) Date of Patent: Sep. 14, 2010

(54) DEVICE AND METHOD FOR CONTROLLING RADIO-FREQUENCY POWER IN WIRELESS TERMINAL

(75) Inventors: In-Tae Jun, Gumi-si (KR); Bo-Kyu Kim, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 503 days.

(21) Appl. No.: 11/774,246

(22) Filed: Jul. 6, 2007

(65) Prior Publication Data

US 2008/0132186 A1   Jun. 5, 2008

(30) Foreign Application Priority Data

Dec. 4, 2006   (KR)   .................. 10-2006-0121510

(51) Int. Cl.
  *H04B 7/00* (2006.01)
(52) U.S. Cl. .................. 455/522; 455/67.11; 455/68; 455/69; 455/127.1
(58) Field of Classification Search .................. 455/522, 455/67.11, 68–70, 115.3, 126, 127.1, 127.2, 455/135, 226.3, 277.2, 296; 370/318
See application file for complete search history.

(56) References Cited

U.S. PATENT DOCUMENTS

| | | | | |
|---|---|---|---|---|
| 5,987,099 | A * | 11/1999 | O'Neill et al. | 455/436 |
| 6,070,058 | A * | 5/2000 | Waldroup et al. | 455/69 |
| 6,272,190 | B1 * | 8/2001 | Campana, Jr. | 375/347 |
| 6,304,139 | B1 * | 10/2001 | Kanno | 330/133 |
| 6,311,044 | B1 * | 10/2001 | Wilde et al. | 455/73 |
| 6,330,433 | B1 * | 12/2001 | Jager | 455/277.2 |
| 6,397,090 | B1 * | 5/2002 | Cho | 455/574 |
| 6,829,226 | B1 | 12/2004 | Apostolides et al. | |
| 7,200,127 | B1 * | 4/2007 | Lee et al. | 370/335 |
| 2002/0089950 | A1 * | 7/2002 | Sourour et al. | 370/335 |

(Continued)

FOREIGN PATENT DOCUMENTS

KR   10-2001-0059820 A   7/2001

(Continued)

*Primary Examiner*—Duc Nguyen
*Assistant Examiner*—Dominic E Rego
(74) *Attorney, Agent, or Firm*—Jefferson IP Law, LLP

(57) ABSTRACT

A device and method for controlling radio-frequency power in a wireless terminal are provided, by which radio-frequency power transmitted from the wireless terminal to a base station is flexibly controlled and transmitted. The device includes a memory that stores an RF power table including the types of power control levels, at least one power classified by the types of power control levels, and at least one received signal strength of the wireless terminal classified by the power, a control unit that performs control to determine the received signal strength of the wireless terminal when a base station requests a change in power control level, to extract a voltage that generates corresponding RF power to the power control level requested to be changed, according to the determined received signal strength of the wireless terminal, and to amplify extracted voltage to transmit to the base station corresponding RF power to the power control level requested to be changed, and a transmission unit that, under the control of the control unit, amplifies the extracted voltage so as to generate corresponding RF power to the power control level requested to be changed, and transmits the same to the base station.

11 Claims, 4 Drawing Sheets

U.S. PATENT DOCUMENTS

| | | | |
|---|---|---|---|
| 2003/0050084 A1* | 3/2003 | Damnjanovic et al. | 455/522 |
| 2004/0203992 A1* | 10/2004 | Yun | 455/522 |
| 2006/0068826 A1* | 3/2006 | Leonard | 455/522 |
| 2007/0066220 A1* | 3/2007 | Proctor et al. | 455/11.1 |
| 2007/0173278 A1* | 7/2007 | Yoon et al. | 455/522 |
| 2008/0057894 A1* | 3/2008 | Aleksic et al. | 455/187.1 |
| 2009/0245419 A1* | 10/2009 | Chan et al. | 375/297 |

FOREIGN PATENT DOCUMENTS

| | | |
|---|---|---|
| KR | 10-2006-0004037 A | 1/2006 |
| KR | 10-2006-0064720 A | 6/2006 |

* cited by examiner

| RSSI (dBm) | Tx power (dBm) | PCL |
|---|---|---|
| −108 | 33 | 5 |
| −107 | | |
| −106 | | |
| −105 | 32 | |
| −104 | | |
| −103 | | |
| −102 | 31 | |
| −101 | | |
| −100 | | |
| −99 | 30.5 | 6 |
| −98 | | |
| −97 | | |
| −96 | 30 | |
| −95 | | |
| −94 | | |
| −93 | 29 | |
| −92 | | |
| −91 | ⋮ | 7 |
| −90 | | |
| −89 | | |
| −88 | | |
| −87 | | |

FIG.2A

| No. | LNA | Rx_AMP1(dB) | Rx_AMP2(dB) | Rx_AMP3(dB) | TYPE | PCL |
|---|---|---|---|---|---|---|
| 1 | On | 40 | 20 | 16 | LOW ELECTRIC FIELD1 (-107~109) | 5 |
| 2 | On | 40 | 20 | 14 | LOW ELECTRIC FIELD2 (-104~-107) | |
| 3 | On | 40 | 20 | 12 | LOW ELECTRIC FIELD3 (-101~-104) | |
| 4 | On | 40 | 20 | 10 | LOW ELECTRIC FIELD4 (-99~-101) | 6 |
| 5 | On | 40 | 20 | 8 | LOW ELECTRIC FIELD5 (-96~99) | |
| ⋮ | | | | | | |
| 23 | On | 30 | 16 | 16 | MIDDLE ELECTRIC FIELD1 (-85~-88) | 12 |
| 24 | On | 30 | 16 | 14 | MIDDLE ELECTRIC FIELD2 (-82~-85) | |
| ⋮ | | | | | | |
| 49 | Off | 0 | 0 | 4 | HIGH ELECTRIC FIELD9 (-66~-69) | 19 |
| 50 | Off | 0 | 0 | 2 | HIGH ELECTRIC FIELD10 (-63~-66) | |

DEVICE AND METHOD FOR CONTROLLING RADIO-FREQUENCY POWER IN WIRELESS TERMINAL

PRIORITY

This application claims the benefit under 35 U.S.C. §119(a) of a Korean patent application filed on Dec. 4, 2006 in the Korean Industrial Property Office and assigned Serial No. 2006-121510, the entire disclosure of which is hereby incorporated by reference.

BACKGROUND OF THE INVENTION

1. Field of the Invention

The present invention relates to a device and method for controlling radio-frequency power in a wireless terminal. More particularly, the present invention relates to a device and method for controlling radio-frequency power in a wireless terminal, by which radio-frequency power transmitted from the wireless terminal to a base station is flexibly controlled and transmitted.

2. Description of the Related Art

Generally, in radio-frequency (RF) power control in a wireless terminal, the wireless terminal transmits to a base station constant RF power corresponding to its power control level (PCL) based on a power control command that is determined and given by the base station. Here, the power difference between respective power levels is about 2 dB per level, and has a tolerance of about maximum ±3 dB per level according to "tolerance for condition" allowed by 3GPP TS 45.005.

When a user makes a call or data communication by using a wireless terminal in a base station network, a base station monitors service quality in real-time, and sends a command to instruct the wireless terminal to level RF power transmitted to the base station up by 1~4 levels or down by 1~2 levels.

For example, when the wireless terminal which is making a call at PCL 8 (a default value: 27 dBm) moves far away from a corresponding base station or when an Rx quality becomes degraded due to occurrence of an obstacle between antennas of the base station and the wireless terminal, the base station sends a command to the wireless terminal to level up an existing power level by three levels so as to have PCL 5 (a default value: 33 dBm) and to transmit (Tx) it. At this time, however, if an Rx quality sufficient to have transmission power of only about 31.5 dBm can in fact be secured in an electrical field of a region where the wireless terminal is located, the wireless terminal may use power by about 1.5 dBm more than it needs. The power difference of 1.5 dB at PCL 5 corresponds to an amount that can improve current consumption of about 20 mA and a surface absorption rate (SAR) of 0.4 mW/g. Since RF power corresponding to respective RF power control levels is designated, if the base station sends a command to provide PCL 5, the wireless terminal must unconditionally transmit RF power of 33 dBm corresponding thereto. Then, in the case where 31.5 dBm is preset from the outset, when the wireless terminal is located in an electrical field lower than the above case, i.e., when an Rx quality can be secured only when RF power of 33 dBm has to be transmitted, there may occur a severe mute effect or a data communication error that a message breakage occurs during a call because a target Rx quality is not secured.

Thus, there is a problem in that even at the same PCL, more power than needed increases the current consumption of the wireless terminal to thereby shorten the lifetime of a battery and to increase an SAR.

SUMMARY OF THE INVENTION

An aspect of the present invention is to address the above-mentioned problems and/or disadvantages and to provide at least the advantages described below. Accordingly, an aspect of the present invention is to provide a device and method for controlling radio-frequency power in a wireless terminal. Radio-frequency power transmitted from the wireless terminal to a base station is flexibly controlled and transmitted.

In accordance with an aspect of the present invention, a device for controlling radio-frequency (RF) power in a wireless terminal is provided. The device includes a memory for storing an RF power table, including the types of power control levels, at least one power classified by the types of power control levels, and at least one received signal strength of the wireless terminal classified by the power. A control unit determines the received signal strength of the wireless terminal when a base station requests a change in power control level, extracts a voltage that generates corresponding RF power to the power control level requested to be changed, according to the determined received signal strength of the wireless terminal, and amplifies extracted voltage to transmit, to the base station, corresponding RF power to the power control level requested to be changed. A transmission unit, under the control of the control unit, amplifies the extracted voltage so as to generate corresponding RF power to the power control level requested to be changed and transmits the same to the base station.

In accordance with another aspect of the present invention, a method of controlling radio-frequency (RF) power in a wireless terminal is provided. The method includes determining received signal strength of the wireless terminal when a base station requests a change in power control level, extracting a voltage for generating corresponding RF power to the power control level of the wireless terminal requested to be changed according to the received signal strength of the wireless terminal, and amplifying the extracted voltage and transmitting, to the base station, corresponding RF power to the power control level requested to be changed.

BRIEF DESCRIPTION OF THE DRAWINGS

The above and other aspects, features and advantages of certain exemplary embodiments of the present invention will be more apparent from the following detailed description taken in conjunction with the accompanying drawings, in which:

FIGS. 2A and 2B are views illustrating a radio-frequency (RF) power table that is stored in a memory illustrated in FIG. 1.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and configurations incorporated herein will be omitted for clarity and conciseness.

Figure 1:
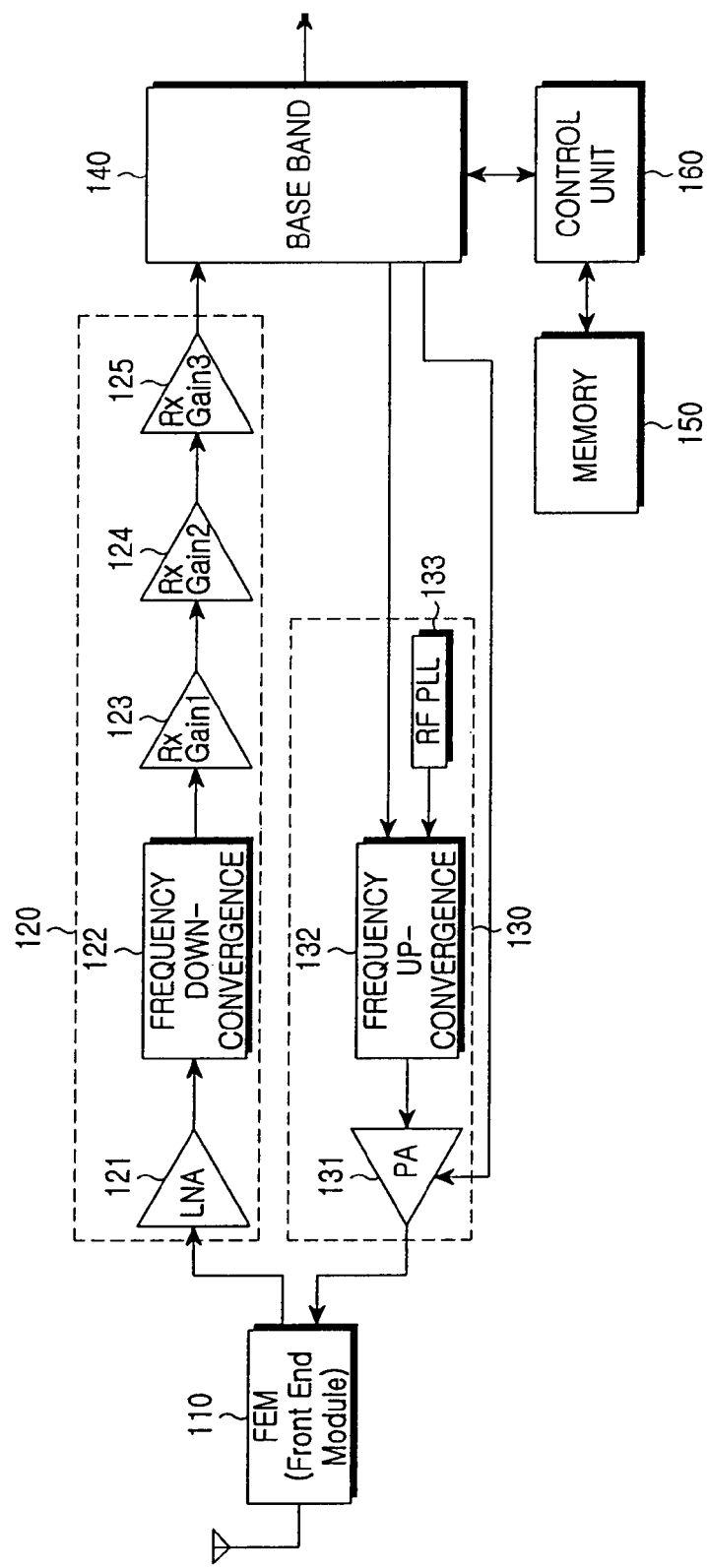
FIG. 1 is a view illustrating a construction of a wireless terminal according to an exemplary embodiment of the present invention.

FIG. 1 is a view illustrating a construction of a wireless terminal according to an exemplary embodiment of the present invention, and FIGS. 2A and 2B are views illustrating a radio-frequency (RF) power table that is stored in a memory illustrated in FIG. 1.

Referring to FIG. 1, a front end module (FEM) 110 branches off into a sending-end and a receiving-end using an antenna of the wireless terminal, and transmits a frequency received from the antenna to an RF receiving unit 120 via the receiving-end. The FEM 110 transmits a transmission frequency received from an RF transmitting unit 130 to the antenna via the sending-end.

The RF receiving unit 120 includes a low noise amplifier (LNA) 121, a frequency down-convergence 122, and first to third amplifiers 123 to 125.

The LNA 121 amplifies, in low noise, a signal received via the FEM 110, and the frequency down-convergence 122 converts down a frequency of the signal amplified by the LNA 121. In order to input a received signal at a constant level to a base band 140 irrespective of an electrical field where the wireless terminal is located, the first to third amplifiers 123 to 125 amplify a voltage of the frequency signal down-converted by the frequency down-convergence 122 according to a preset Rx gain setting value, and input it to the base band 140.

The RF transmitting unit 130 includes a frequency up-convergence 132, an RF phase locked loop (PLL) 133, and a power amplifier (PA) 131.

The frequency up-convergence 132 converts up a frequency of the sending signal, and the RF PLL 133 maintains the signal input to the frequency up-convergence 132 at a specified phase. The PA 131 amplifies the frequency signal up-converted via the frequency up-convergence 132, and transmits it via the FEM 110 and the antenna. In addition, according to a change in power control level, which is requested by the base station in accordance with an exemplary embodiment of the invention, the PA 131 amplifies a voltage for generating RF power corresponding to the power control level requested to be changed, and transmits it to the base station via the FEM 110 and the antenna.

The base band 140 codes and modulates the transmitting signal, and demodulates and decodes the received signal.

The memory 150 may include a program memory and data memories. The program memory can store therein programs for controlling the general operation of the wireless terminal, and a program capable of flexibly controlling RF power transmitted to the base station. In addition, the memory 150 includes an RF power table capable of detecting corresponding RF power to the power control level according to received signal strength of the wireless terminal when the base station requests a change in power control level. The RF power table includes types of power control levels, at least one power in which power control levels are classified by the types, and at least one received signal strength of the wireless terminal that is classified according to the power. FIGS. 2A and 2B are views illustrating a RF power table using the received signal strength.

A first RF power table in FIG. 2A specifies corresponding power to the power control level using a received signal strength indicator (RSSI) value that is reported in real-time to the base station when the wireless terminal is located in a network of the base station. The first RF power table stores therein power control levels (PCL), powers classified corresponding to the power control levels, and the received signal strength values corresponding to the classified powers. Any one power among the powers classified corresponding to one power control level in the first RF power table is power that corresponds to a preset voltage, and the powers other than the corresponding power to the preset voltage use an equation 1 below to extract corresponding voltages with multiplication of a certain value.

$$Vdac\_NEW = \text{Weight Factor} * Vdac\_OLD \quad \text{Equation 1}$$

Herein, Vdac_OLD indicates power corresponding to the preset voltage, and the Weight Factor is a constant value that is larger than 0 and smaller than 2 (0<Weight Factor<2).

In the first RF power table, for instance, when power of 32 dBm of the powers (33 dBm, 32 dBm, and 31 dBm) at PCL "5" is set as power of a preset voltage value (750 Vdac), in order to transmit RF power of 31 dBm to the base station, the voltage value (735 Vdac) for generating RF power of 31 dBm is extracted by the calculation of "750 Vdac*0.98=735 Vdac".

That is, in the case of transmitting power larger than power corresponding to the preset voltage value, the power value corresponding to the preset voltage value is multiplied by a constant value (weight factor) ranging between 1 and 2. In addition, in the case of transmitting power smaller than power corresponding to the preset voltage value, the power value corresponding to the preset voltage value is multiplied by a constant value (weight factor) ranging between 0 and 1.

A second RF power table in FIG. 2B specifies corresponding power to the power control level using an Rx gain setting value that is pre-defined to control the first to third amplifiers 123 to 125 of the receiving unit 120 in order to transfer, to the base band 140, an always-constant received signal irrespective of the types of electrical fields (low electrical field, middle electrical field, and high electrical field) classified according to the received signal strength of the wireless terminal. The second RF power table stores therein power control levels (PCL) and types of electrical fields classified corresponding to the power control levels.

A power value corresponding to any one type of the electrical fields classified corresponding to one power control level in the second RF power table is power that corresponds to a preset voltage, and the powers other than the corresponding power to the preset voltage use the equation 1 to extract corresponding voltages with multiplication of a certain value.

In the second RF power table, for instance, when power of 32 dBm corresponding to a low electrical field 2 among the electrical fields (a low electrical field 1, a low electrical field 2, and a low electrical field 3) at PCL "5" is set as power of a preset voltage value (750 Vdac), in order to transmit, to the base station, RF power of 33 dBm corresponding to the low electrical field 1, the voltage value (1,485 Vdac) for generating RF power of 33 dBm is extracted by the calculation of "750 Vdac*1.98=1,485 Vdac".

The control unit 160 performs a function of controlling the general operation of the wireless terminal. In an exemplary implementation, the control unit 160 may determine whether a request is made for a change in power control level of the wireless terminal according to a power control command received from the base station in a communication mode of the wireless terminal capable of making a call or data communication.

If the base station has requested a change in power control level, the control unit 160 performs control to seek the power control level requested to be changed and corresponding power to the determined received signal strength of the wireless terminal, using first and second RF power tables stored in the memory 150.

The control unit 160 determines whether or not a voltage for generating the sought power that corresponds to one corresponding to the preset power is requested, and if the power is one corresponding to the preset voltage, it extracts the preset voltage. If not, the control unit 160 extracts corresponding voltage by multiplying the preset voltage by the constant value (weight factor).

Furthermore, the control unit 160 amplifies extracted voltage with the PA 131 of the transmitting unit 132 and transmits, to the base station, RF power corresponding to the power control level requested to be changed.

Figure 3:
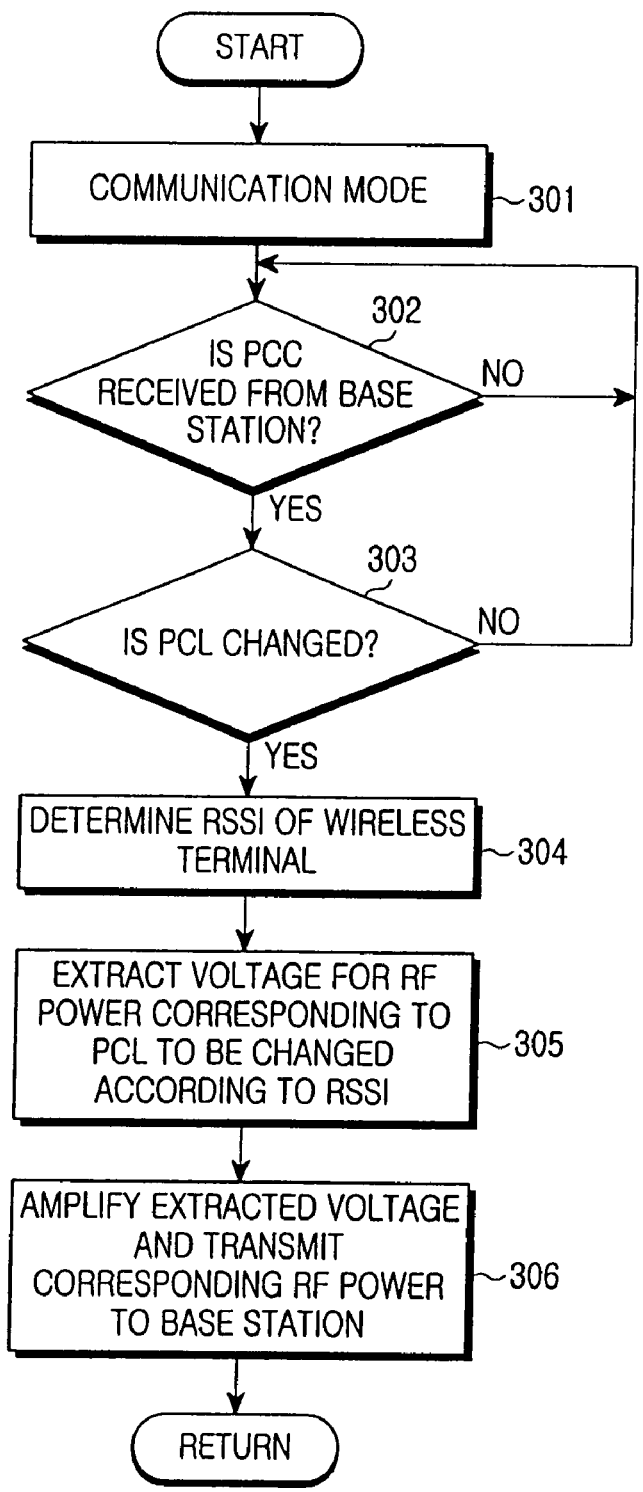
FIG. 3 is a flow chart illustrating an operation of controlling RF power in a wireless terminal according to an exemplary embodiment of the present invention.

FIG. 3 is a flow chart illustrating an operation of controlling RF power in a wireless terminal according to an exemplary embodiment of the present invention.

An exemplary embodiment of the present invention will now be explained in detail with reference to FIG. 3 together with FIGS. 1 and 2.

Referring to FIG. 3, making a call or data communication is performed in a communication mode of the wireless terminal in step 301. When receiving a power control command (PCC) from the base station in step 302, the control unit 160 detects a change in power control level through the PCC received from the base station in step 303.

According to the request from the base station for a change in power control level, the control unit 160 performs step 304 to determine received signal strength in the present position where the wireless terminal is located. When the received signal strength is determined in step 304, the control unit 160 extracts a voltage for generating power corresponding to the power control level requested to be changed in step 305, through searching first or second RF power table of FIG. 2A or 2B stored in the memory 150.

The control unit 160 amplifies the extracted voltage via the PA 131 of the RF transmitting unit 130 and transmits to the base station RF power corresponding to the power control level requested to be changed from the base station in step 306.

For instance, when receiving from the base station a power control command to change PCL to "5" in step 301 to perform a communication mode at PCL "6" of the wireless terminal, the control unit 160 detects it in steps 302 and 303, and determines the present received signal strength of the wireless terminal in step 304.

When the present received signal strength of the wireless terminal is "−102 dBm", the control unit 160 searches, on the first RF power table of FIG. 2A, power that corresponds to the received signal strength of "−102 dBm" at PCL "5".

Herein, when power of 32 dBm among the powers (33 dBm, 32 dBm, and 31 dBm) at PCL "5" is set as power of preset voltage value (750 Vdac), in order to transmit to the base station RF power of 31 dBm corresponding to "−102 dBm" of the received signal strength at the PCL "5", the control unit 160 extracts the voltage value (735 Vdac) for generating RF power of 31 dBm by the calculation of "750 Vdac*0.98=735 Vdac". The control unit 160 amplifies extracted voltage (735 Vdac) with the PA 131 of the RF transmitting unit 130 and to transmit it to the base station in step 306.

On the other hand, when the present received signal strength of the wireless terminal is "−108 dBm", the control unit 160 searches, on the second RF power table of FIG. 2B, power that corresponds to the received signal strength of "−108 dBm" at PCL "5".

Herein, when power of 32 dBm corresponding to a low electrical field 2 among the electrical fields (a low electrical field 1, a low electrical field 2, and a low electrical field 3) at PCL "5" is set as power of preset voltage value (750 Vdac), in order to transmit to the base station RF power of 33 dBm corresponding to the low electrical field 1, of which the received signal strength is "−108 dBm" at the PCL "5", the control unit 160 extracts the voltage value (1,485 Vdac) for generating RF power of 33 dBm by the calculation of "750 Vdac*1.98=1,485 Vdac". The control unit 160 amplifies extracted voltage (1,485 Vdac) with the PA 131 of the RF transmitting unit 130 and to transmit it to the base station in step 306.

As set forth before, according to the present invention, there is provided a device and method for controlling radio-frequency power in a wireless terminal, by which radio-frequency power transmitted from the wireless terminal to the base station is flexibly controlled and transmitted, whereby radio-frequency transmitted from the wireless terminal to the base station is efficiently controlled to thereby optimally improve current consumption, a surface absorption rate, and a calling quality of the wireless terminal.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A device for controlling Radio-Frequency (RF) transmission power of a wireless terminal, the device comprising:
   a memory that stores a transmission power table including power control levels, at least one transmission power classified by the power control levels, and at least one Received Signal Strength Indicator (RSSI) of the wireless terminal classified by the transmission power;
   a control unit for determining an RSSI of the wireless terminal, when the base station requests a change in a power control level, and for extracting a voltage used for controlling a transmission power of the wireless terminal that corresponds to the requested change in the power control level, according to the determined RSSI of the wireless terminal; and
   a transmission unit, under control of the control unit, for amplifying the extracted voltage to transmit a signal to the base station with the transmission power that corresponds to the requested change in the power control level.

2. The device according to claim 1, wherein the control unit determines the power control level to be changed according to a power control command received from the base station in a communication mode of the wireless terminal.

3. The device according to claim 1, wherein the control unit performs control to search, in the transmission power table stored in the memory, for a transmission power corresponding to the requested change in the power control level and the determined RSSI of the wireless terminal, and to extract the voltage used to control the transmission power of the wireless terminal, based on the transmission power found in the transmission power table.

4. The device according to claim 3, wherein the control unit determines whether the transmission power found in the transmission power table corresponds to a preset voltage, and if the transmission power found in the transmission power table corresponds to the preset voltage, extracts the preset voltage, and if the transmission power found in the transmission power table does not correspond to the preset voltage, extracts the voltage by multiplying the preset voltage by a constant value.

5. The device according to claim 4, wherein the constant value is larger than 0 and smaller than 2.

6. A method of controlling Radio-frequency (RF) transmission power of a wireless terminal, the method comprising:
- determining a Received Signal Strength Indicator (RSSI) of the wireless terminal, when a base station requests a change in a power control level;
- extracting a voltage used for controlling a transmission power of the wireless terminal that corresponds to the requested change in the power control level, according to the determined RSSI of the wireless terminal; and
- amplifying the extracted voltage, and transmitting a signal to the base station with the transmission power that corresponds to the requested change in the power control level.

7. The method according to claim 6, further comprising:
- receiving in a communication mode of the wireless terminal, a power control command for controlling the transmission power of the wireless terminal, from the base station; and
- determining the power control level to be changed according to the received power control command.

8. The method according to claim 6, wherein the extracting of the voltage comprises:
- searching in a transmission power table for a transmission power that corresponds to the requested change in the power control level and the determined RSSI of the wireless terminal; and
- extracting the voltage used to control the transmission power of the wireless terminal, based on the transmission power found in the transmission power table.

9. The method according to claim 8, wherein the extracting of the voltage comprises:
- determining whether the transmission power found in the transmission power table corresponds to a preset voltage;
- if the transmission power found in the transmission power table corresponds to the preset voltage, extracting the preset voltage; and
- if the transmission power found in the transmission power table does not correspond to the preset power, extracting the voltage by multiplying the preset voltage by a constant value.

10. The method according to claim 9, wherein the constant value is larger than 0 and smaller than 2.

11. The method according to claim 8, wherein the transmission power table comprises power control levels, at least one transmission power classified by the power control levels, and at least one RSSI of the wireless terminal classified by the transmission power.

* * * * *